July 15, 1930.  S. D. HARTOG  1,770,644
CONNECTING ROD
Filed Nov. 7, 1927
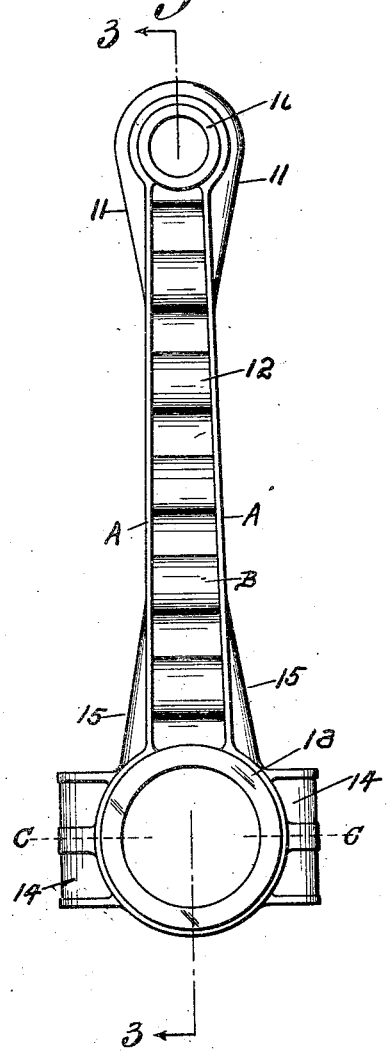
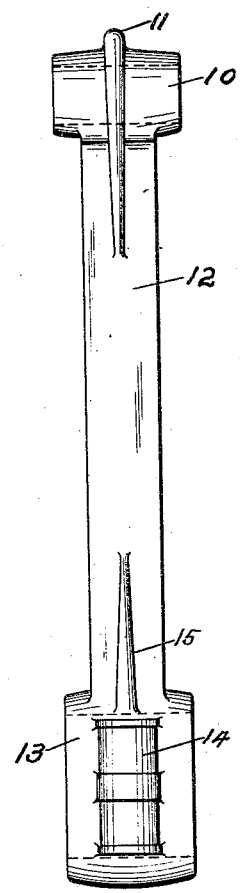
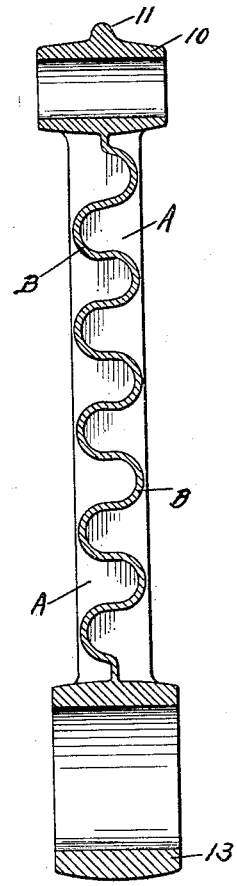
INVENTOR:
Stephen D. Hartog Patented July 15, 1930

1,770,644

UNITED STATES PATENT OFFICE

STEPHEN D. HARTOG, OF ST. LOUIS, MISSOURI, ASSIGNOR TO HARRY J. HATER, OF CINCINNATI, OHIO

CONNECTING ROD

Application filed November 7, 1927. Serial No. 231,587.

My invention relates to improvements in connecting rods and more particularly to connecting rods adapted for use in internal combustion engines although not necessarily restricted to this use.

The connecting rod is that member of an internal combustion engine which operatively connects the piston of the engine to the crank shaft thereof whereby motion is imparted to mechanism connected therewith.

The performance of internal combustion engines is improved and wear is reduced by the use of light weight reciprocating parts, and an object of the present invention is to provide a connecting rod made of light weight material having a low specific gravity and so constructed that the rod will have the desired strength.

Other objects and advantages of my invention will be apparent during the course of the following description.

In the accompanying drawings which form a part of this specification and wherein like characters of reference denote like or corresponding parts throughout the same, Figure 1 is a side elevation of my improved connecting rod, Figure 2 is a front elevation thereof, Figure 3 is a longitudinal sectional view taken on the line 3—3 of Figure 1.

In the drawings, wherein for the purpose of illustration is shown a preferred embodiment of my invention, the connecting rod is shown as comprising a journal end bearing 10 having a reinforcing rib 11 on the exterior thereof, a body or shank 12 composed of longitudinally extending bars A—A and a web B arranged therebetween, and a journal end bearing 13 having laterally projecting bosses 14 and reinforcing ribs 15.

The connecting rod is a unitary structure formed from material having a comparatively low specific gravity such as aluminum, aluminum alloy, magnesium and the like and the rod is so constructed that the desired strength is obtained. The rib 11 extends around the journal end bearing 10 and a substantial distance down the sides of the bars A.

The web B is designed to increase the strength of the rod which during the operation of the engine is subjected to stresses transversely and longitudinally thereof, and the web is therefore corrugated as shown to give added strength to the rod. The corrugations are arranged in S-form, the channel of one corrugation extending a substantial distance beyond the end walls of the channels of the adjacent corrugations as shown in Figure 3 to produce an overlapping of the channels of the corrugations. The corrugations preferably extend substantially to the edges of the bars A, and join with the journal end bearings adjacent their centers, and centrally of the bars A.

The crank shaft journal 13 is arranged at the lower end of the rod and is apertured and machined to receive the crank shaft. After the rod is cast, the crank shaft journal end bearing is split along the line C—C for enabling its assembly with the shaft. Bosses 14 are formed on journal 13 through which suitable openings are bored to receive clamping bolts adapted to secure the split portions of the journal on the crank shaft.

Reinforcing ribs 15 extend from the bosses 14 along the journal 13 and a substantial distance up the bars A and serve to strengthen this portion of the rod.

The machining and preparation of a connecting rod for assembly with its related parts is so well known that a detailed description thereof is not necessary, but the present invention may be integrally formed by casting in a sand flask, metal mold or drop forge and subsequently heat treated, and with the exception of the split in the journal 13 the rod is a single integral structure.

While I have shown and described the preferred embodiment of my invention it is to be understood that various changes in the size, shape and arrangement of parts may be resorted to without departing from the spirit of my invention or the scope of the subjoined claims.

Having thus described my invention what I claim and desire to protect by Letters Patent is:

1. A connecting rod comprising journal end bearings, and a shank connecting said bearings, said shank comprising a pair of spaced bars connected by a corrugated web, the corrugations of said web extending substantially to the edges of the bars and being arranged in overlapping relation.

2. A connecting rod comprising journal end bearings, a pair of bars connecting said bearings, a web arranged between said bars and connecting the same, said web having corrugations the channels of which are arranged in overlapping relation, and reinforcing ribs extending from said bearings to points on said bars spaced from said bearings.

3. A connecting rod having a shank comprising a pair of spaced bars and a corrugated web arranged therebetween, the channels of said corrugations being arranged in overlapping relation and extending substantially to the edges of the bars.

4. A connecting rod comprising an integral casting having a transversely corrugated web member, the channels of the corrugations being arranged in overlapping relation, a split connecting rod bearing integrally formed on one end of said casting, ribs extending around a portion of said connecting rod bearing and along a portion of the length of said casting, a wrist pin bearing integrally formed on the other end of said casting, and a rib extending around said wrist pin bearing and along a portion of the length of said casting.

5. A connecting rod formed from a material having a relatively low specific gravity and having a shank casting comprising a pair of spaced bars and a transversely corrugated web connecting said bars throughout their length, the channels of said corrugations being arranged in overlapping relation said corrugations extending to points adjacent the edges of the bars, a split connecting rod bearing integrally formed on one end of the casting, a wrist pin bearing integrally formed on the other end of the casting, and reinforcing members connecting the bearings with the casting.

6. A connecting rod comprising journal end bearings, and a shank connecting said bearings, said shank comprising a pair of spaced bars arranged substantially parallel to the axes of the bearings, and a corrugated web connecting said bars, the channels of the corrugations of said web being arranged in overlapping relation.

7. A connecting rod comprising journal end bearings and a shank connecting said bearings, said shank comprising a pair of spaced bars arranged substantially parallel to the axes of the bearings and a corrugated web connecting said bars, the channels of the corrugations of said web being arranged in overlapping relation, and reinforcing ribs connecting the bearings with the spaced bars.

In confirmation hereof I hereto attach my signature.

STEPHEN D. HARTOG.